US010681745B2

(12) United States Patent
Chandramouli

(10) Patent No.: US 10,681,745 B2
(45) Date of Patent: Jun. 9, 2020

(54) RADIO RESOURCE ALLOCATION FOR PROXIMITY SERVICES

(71) Applicant: NOKIA SOLUTIONS AND NETWORKS OY, Espoo (FI)

(72) Inventor: Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 475 days.

(21) Appl. No.: 15/317,754

(22) PCT Filed: Jun. 26, 2014

(86) PCT No.: PCT/EP2014/063523
§ 371 (c)(1),
(2) Date: Dec. 9, 2016

(87) PCT Pub. No.: WO2015/197119
PCT Pub. Date: Dec. 30, 2015

(65) Prior Publication Data
US 2017/0105236 A1 Apr. 13, 2017

(51) Int. Cl.
*H04W 76/10* (2018.01)
*H04W 4/80* (2018.01)
*H04W 72/04* (2009.01)

(52) U.S. Cl.
CPC ............ *H04W 76/10* (2018.02); *H04W 4/80* (2018.02); *H04W 72/0406* (2013.01)

(58) Field of Classification Search
CPC .................................................... H04W 76/02
USPC ........................................................ 370/329
See application file for complete search history.

(56) References Cited

U.S. PATENT DOCUMENTS

| 2011/0098043 A1* | 4/2011 | Yu ......................... H04W 60/00 455/435.1 |
| 2014/0256365 A1* | 9/2014 | Schmidt .................. H04W 4/90 455/466 |
| 2015/0264733 A1* | 9/2015 | Guo ....................... H04W 48/06 370/329 |
| 2015/0282234 A1* | 10/2015 | Sartori ............... H04W 28/0278 370/329 |

(Continued)

FOREIGN PATENT DOCUMENTS

WO WO 2007/073040 A1 6/2007
WO WO 2014/014323 A1 1/2014

OTHER PUBLICATIONS

International Search Report and Written Opinion dated May 15, 2015 corresponding to International Patent Application No. PCT/EP2014/063523.

(Continued)

*Primary Examiner* — Shripal K Khajuria
(74) *Attorney, Agent, or Firm* — Squire Patton Boggs (US) LLP

(57) ABSTRACT

Radio resource allocation for proximity services There are provided measures for radio resource allocation for proximity services. Such measures exemplarily comprise receiving a message including a service request and indicative of a demand of a proximity service, detecting said demand of said proximity service from said message, and preventing, based on said demand of said proximity service, a transmission of an end entity context related to said service request.

18 Claims, 12 Drawing Sheets

(56) References Cited

U.S. PATENT DOCUMENTS

| | | | | |
|---|---|---|---|---|
| 2015/0327201 A1* | 11/2015 | He | ........................ | H04W 48/16 370/336 |
| 2015/0327311 A1* | 11/2015 | Wei | ..................... | H04L 12/6418 370/329 |
| 2015/0327312 A1* | 11/2015 | Burbidge | .............. | H04W 72/14 370/329 |

OTHER PUBLICATIONS

Intel Corporation: "RRC connection establishment for the purpose of D2D mode 1 resource allocation," 3GPP Draft; R2-142049, 3GPP TSG-RAN WG2 Meeting #86, Seoul, Korea, May 19-23, 2014, May 18, 2014, XP050793290, pp. 1-3.

3GPP TS 24.334 V1.0.0 (Jun. 2014), Technical Specification, 3rd Generation Partnership Project; Technical Specification Group Core Network and Terminals; Proximity-services (ProSe) User Equipment (UE) to Proximity-services (ProSe) Function Protocol aspects; Stage 3 (Release 12), Jun. 2014, 43 pages.

3GPP TS 36.300 V12.1.0 (Mar. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Mar. 2014, 209 pages.

3GPP TS 36.331 V12.1.0 (Mar. 2014), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Mar. 19, 2014, XP050769960, 356 pages.

Huawei et al: "Update and Evaluation on ProSe discovery solution D9," 3GPP Draft; S2-134067, SA WG2 Meeting #100, Nov. 11-15, 2013, San Francisco, USA, Nov. 5, 2013, XP050764638, pp. 1-11.

Qualcomm Incorporated: "Pseudo-CR on transmission resources request for ProSe direct discovery," 3GPP Draft; C1-141846, 3GPP TSG CT WG1 Meeting #87, Phoeniz, Arizona, May 19-23, 2014, 3 pages.

Qualcomm Incorporated, "Addition of SR trigger for ProSe," Change Request, 3GPP Draft; C1-141847, 3GPP TSG-CT WG1 Meeting #87, Phoenix, Arizona, May 19-23, 2014.

Qualcomm Incorporated, "Introduction of ProSe," Change Request, 3GPP Draft; R2-141859, 3GPP TSG-RAN WG2 #85 Bis, Valencia, Spain, Mar. 31-Apr. 4, 2014.

3GPP TS 22.278 V12.4.0 (Sep. 2013), Technical Specification, 3rd Generation Partnership Project; Technical Specification Group Services and System Aspects; Service Requirements for the Evolved Packet System (EPS) (Release 12), Sep. 2013, 45 pages.

3GPP TS 23.303 V12.1.0 (Jun. 2014), Technical Specification, 3rd Generation Partnership Project; Technical Specification Group Services and System Aspects; Proximity-based services (ProSe); Stage 2 (Release 12), Jun. 20, 2014, XP050872397, 60 pages.

3GPP TS 23.401 V12.5.0 (Jun. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 20, 2014, XP0050774115, pp. 1-305.

3GPP TS 24.301 V12.4.0 (Mar. 2014), Technical Specification, 3rd Generation Partnership Project; Technical Specification Group Core Network and Terminals; Non-Access-Stratum (NAS) protocol for Evolved Packet System (EPS); Stage 3 (Release 12), Mar. 2014, 362 pages.

Communication pursuant to Article 94(3) EPC dated Nov. 6, 2019 corresponding to European Patent Application No. 14735511.9.

* cited by examiner

RADIO RESOURCE ALLOCATION FOR PROXIMITY SERVICES

FIELD

The present invention relates to radio resource allocation for proximity services. More specifically, the present invention exemplarily relates to measures (including methods, apparatuses and computer program products) for realizing radio resource allocation for proximity services.

BACKGROUND

The present specification generally relates to preparation of proximity services, in particular to negotiation, between an end entity and a network, of conditions for proximity services.

It is worked (e.g. $3^{rd}$ Generation Partnership Project (3GPP)) on techniques that enables direct discovery between user equipments (UE), i.e. UE-UE discovery, and UE-UE communication over Long Term Evolution (LTE) radio interface (also known as proximity services). Such proximity services may be used for example for public safety communication over LTE radio. Another possible exemplary application may be commercial discovery and communication.

In order to avail proximity services, UE(s) need to obtain authorization from the network for availing radio resources. Two types of resource allocation mechanisms are known from RAN2 specification regarding radio resource allocation for proximity services (ProSe) direct discovery announcing.

According to a first type of resource allocation for discovery information announcement, a resource allocation procedure where resources for announcing of discovery information are allocated on a non UE specific basis is described such that an evolved NodeB (eNB) provides the UE(s) with a resource pool configuration used for announcing of discovery information. The configuration may be signaled in a system information block (SIB). Then, a respective UE autonomously selects radio resource(s) from the indicated resource pool and announces discovery information. The UE can announce discovery information on a randomly selected discovery resource during each discovery period.

According to a second type of resource allocation for discovery information announcement, a resource allocation procedure where resources for announcing of discovery information are allocated on per UE specific basis is described such that a UE in RRC_CONNECTED may request resource(s) for announcing of discovery information from the eNB via radio resource control (RRC). The respective eNB assigns resource(s) via RRC. The resources are allocated within a resource pool that is configured in UEs for monitoring. For UEs in RRC_IDLE, the respective eNB may, on the one hand, provide a resource pool according to the first type described above for discovery information announcement in SIB. UEs that are authorized for ProSe direct discovery may use these resources for announcing discovery information in RRC_IDLE. On the other hand, the eNB may indicate in SIB that it supports device to device (D2D) but does not provide resources for discovery information announcement. UEs need to enter RRC_CONNECTED in order to request D2D resources for discovery information announcement. Once a UE authorized to perform ProSe direct discovery announcement entered RRC_CONNECTED, it indicates to the eNB that it wants to perform D2D discovery announcement.

The UE non-access stratum (NAS) layer is the trigger to initiate radio resource allocation for D2D discovery and communication.

According to a both types of resource allocation for discovery information announcement, there is a need for the respective UE to initiate a service request (SR) procedure to transfer the UE to ECM_CONNECTED mode to enable UE RRC layer to send discovery indication to eNB for RRC connection establishment.

In particular, the UE sends a service request that results in a data radio bearer (DRB) establishment although UE does not need the DRB for any purpose in this case, i.e., although the UE has no uplink data to be sent to the network.

Hence, the problem arises that an unnecessary use of radio resources and core network resources are raised to enable D2D discovery and communication, although only a signaling radio bearer (SRB) is needed to enable authorization of radio resources use for direct discovery and communication.

Further, according to the known service request procedure, the only indication of successful completion of the service request procedure to the UE is the establishment of radio access bearers (RAB) before expiry of a timer T3417/T3417ext. If the RABs establishment is unsuccessful before the UE NAS layer timer for SR times out, then it considers that the procedure has failed and takes necessary action (i.e. repeats SR, informs upper layer or other implementation specific actions).

Hence, the further problem arises that an unnecessary (fully) blown SR procedure is used although only a resource allocation for discovery information announcement is demanded.

Thus, there is a strong desire for an optimized procedure for D2D in 3GPP.

Hence, there is a need to provide for radio resource allocation for proximity services, and in particular, for an optimized procedure/behavior for radio resource allocation for proximity services.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising transmitting a radio resource control connection establishment request indicative of a demand of a proximity service, receiving a radio resource control connection setup message including information indicative of radio resources allocated for said proximity service, and deciding, whether said radio resources are authorized, based on said receiving of said radio resource control connection setup message.

According to an exemplary aspect of the present invention, there is provided a method comprising receiving a radio resource control connection establishment request indicative of a demand of a proximity service, allocating radio resources for said proximity service, and transmitting a radio resource control connection setup message including information indicative of said radio resources.

According to an exemplary aspect of the present invention, there is provided a method comprising receiving a message including a service request and indicative of a demand of a proximity service, detecting said demand of said proximity service from said message, and preventing, based on said demand of said proximity service, a transmission of an end entity context related to said service request.

According to an exemplary aspect of the present invention, there is provided an apparatus comprising transmitting means configured to transmit a radio resource control connection establishment request indicative of a demand of a proximity service, receiving means configured to receive a radio resource control connection setup message including information indicative of radio resources allocated for said proximity service, and deciding means configured to decide, whether said radio resources are authorized, based on said receiving of said radio resource control connection setup message.

According to an exemplary aspect of the present invention, there is provided an apparatus comprising receiving means configured to receive a radio resource control connection establishment request indicative of a demand of a proximity service, allocating means configured to allocate radio resources for said proximity service, and transmitting means configured to transmit a radio resource control connection setup message including information indicative of said radio resources.

According to an exemplary aspect of the present invention, there is provided an apparatus comprising receiving means configured to receive a message including a service request and indicative of a demand of a proximity service, detecting means configured to detect said demand of said proximity service from said message, and preventing means configured to prevent, based on said demand of said proximity service, a transmission of an end entity context related to said service request.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient reduction of management effort and traffic load related to radio resource allocation for proximity services to thereby solve at least part of the problems and drawbacks identified in relation to the prior art.

In particular, according to exemplary embodiments of the present invention, techniques are provided for radio resource allocation for D2D discovery and communication in LTE without having to establish all radio access bearers (RAB), i.e., without bringing up all packet data network (PDN) connections and bearers, when they are not necessary. Furthermore, according to exemplary embodiments of the present invention, existing "always on" principles in LTE are retained.

By way of exemplary embodiments of the present invention, there is provided radio resource allocation for proximity services. More specifically, by way of exemplary embodiments of the present invention, there are provided measures and mechanisms for realizing radio resource allocation for proximity services.

Thus, improvement is achieved by methods, apparatuses and computer program products enabling/realizing radio resource allocation for proximity services.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
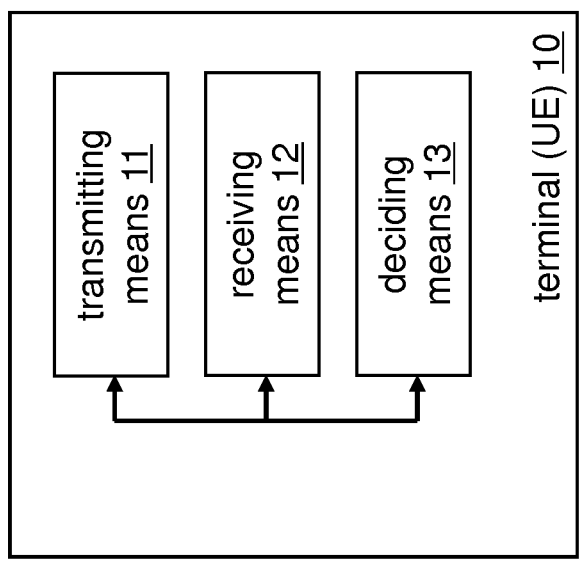
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, 3GPP LTE proximity service is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) radio resource allocation for proximity services.

According to exemplary embodiments of the present invention, an optimized technique for proximity services discovery and communication is proposed.

Exemplary embodiments of the present invention may be summarized as follows. An RRC establishment cause and/or NAS cause code for ProSe is introduced to enable eNB and mobility management entity (MME) to determine the reason for connection establishment. The eNB may use the new cause code to perform both admission control and authorize radio resources. The MME may use the new RRC establishment cause and/or NAS service type to determine whether a DRB should be setup and RRC measurement should be configured. This may also be used to help avoid RRC signaling for measurements. Finally, the MME may use this information to determine that the NAS connection can be released immediately after the procedure is complete. This also helps retain basic "always on" principles in LTE for the UE(s).

Exemplary embodiments of the present invention may be implemented by means of the following two options. However, the present invention is not limited to the two options as summarized below.

According to a first option, in short, a service request procedure is performed, RABs are not established, and the network cancels the SR procedure if it was initiated for ProSe D2D discovery/communication upon completion. The UE access stratum (AS) layer uses the successful RRC connection establishment and radio resource allocation for D2D discovery/communication as an indication that radio resources have been authorized.

FIG. 1 is a block diagram illustrating an apparatus according to exemplary embodiments of the present invention. The apparatus may be a terminal 10 such as a user equipment comprising a transmitting means 11, a receiving means 12, and a deciding means 13. The transmitting means 11 transmits a radio resource control connection establishment request indicative of a demand of a proximity service. The receiving means 12 receives a radio resource control connection setup message including information indicative of radio resources allocated for said proximity service. The deciding means 13 decides, whether said radio resources are authorized, based on said receiving of said radio resource control connection setup message.

Figure 2:
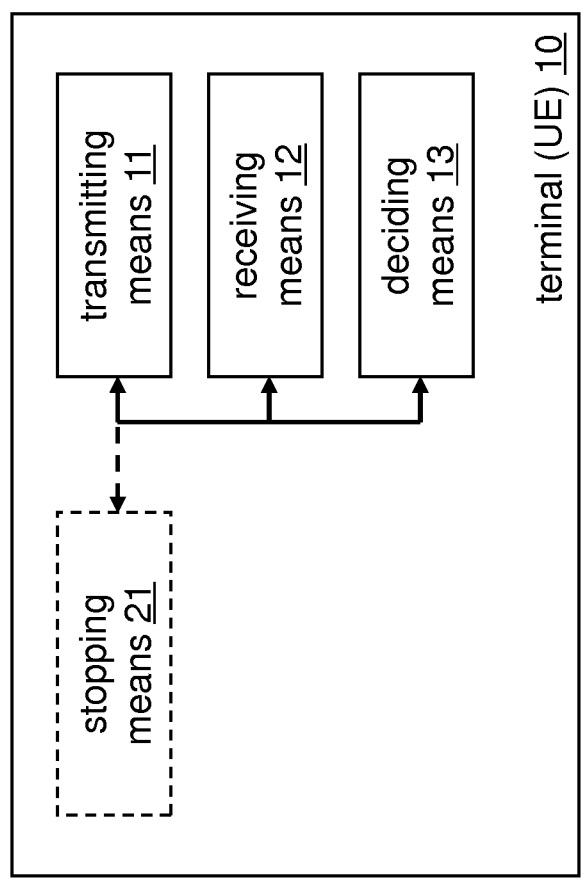
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the terminal 10 shown in FIG. 1. The apparatus according to FIG. 2 may thus further comprise stopping means 21.

Figure 7:
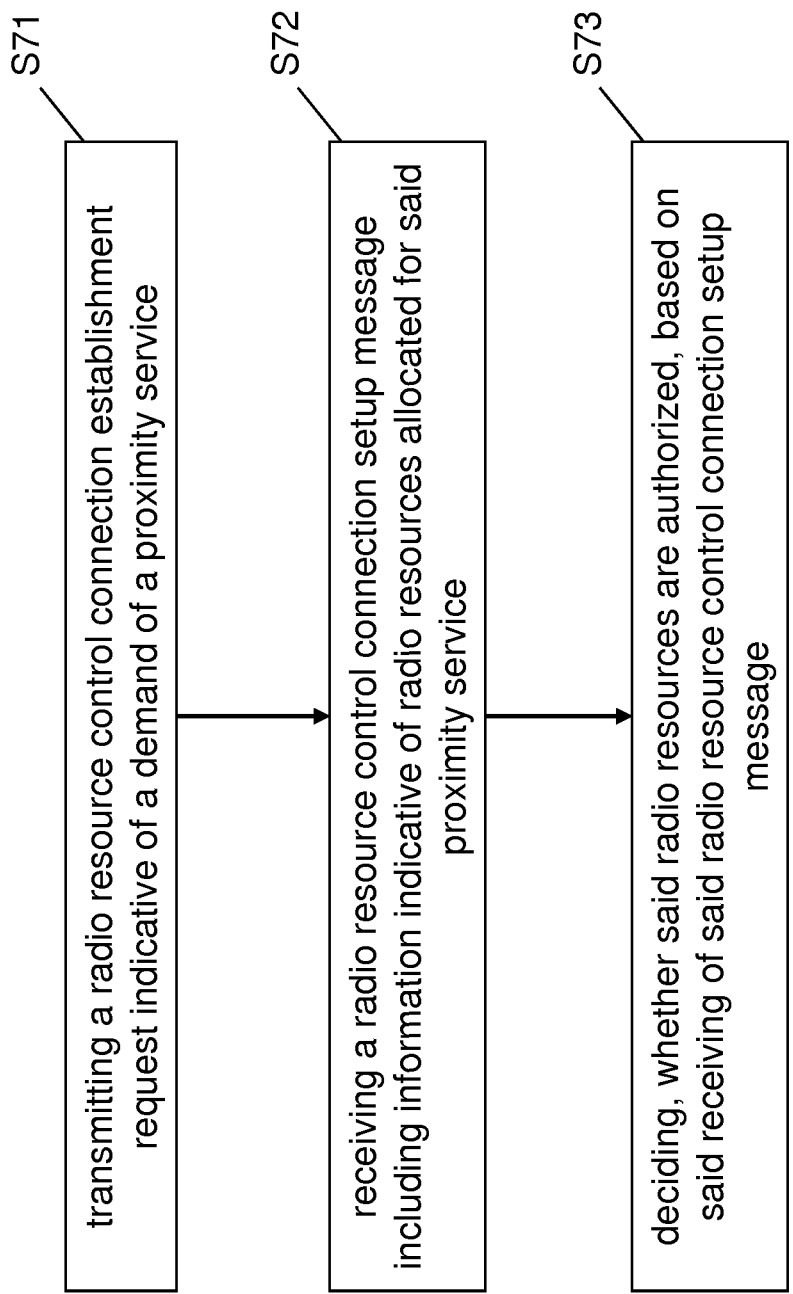
FIG. 7 is a schematic diagram of a procedure according to exemplary embodiments of the present invention.

FIG. 7 is a schematic diagram of a procedure according to exemplary embodiments of the present invention. The apparatus according to FIG. 1 (or FIG. 2) may perform the method of FIG. 7 but is not limited to this method. The method of FIG. 7 may be performed by the apparatus of FIG. 1 (or FIG. 2) but is not limited to being performed by this apparatus.

As shown in FIG. 7, a procedure according to exemplary embodiments of the present invention comprises an operation of transmitting (S71) a radio resource control connection establishment request indicative of a demand of a proximity service, an operation of receiving (S72) a radio resource control connection setup message including information indicative of radio resources allocated for said proximity service, and an operation of deciding (S73), whether said radio resources are authorized, based on said receiving of said radio resource control connection setup message.

According to a variation of the procedure shown in FIG. 7, exemplary additional operations are given, which are inherently independent from each other as such. According to such variation, an exemplary method according to exemplary embodiments of the present invention may comprise an operation of transmitting, in response to said radio resource control connection setup message, a radio resource control connection setup complete message including a service request.

According to a variation of the procedure shown in FIG. 7, exemplary additional operations are given, which are inherently independent from each other as such. According to such variation, an exemplary method according to exemplary embodiments of the present invention may comprise an operation of receiving a downlink information transfer message.

According to a variation of the procedure shown in FIG. 7, exemplary additional operations are given, which are inherently independent from each other as such. According to such variation, an exemplary method according to exemplary embodiments of the present invention may comprise an operation of receiving a radio resource control release message, and an operation of stopping a timer indicative of a successful completion of a procedure related to said service request.

Figure 3:
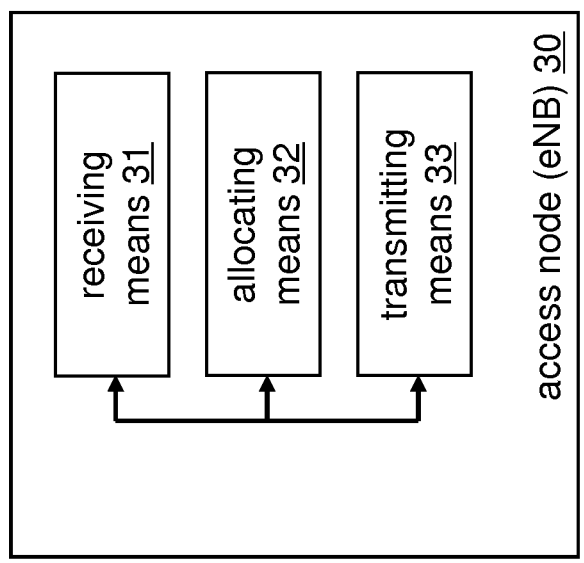
FIG. 3 is a block diagram illustrating an apparatus according to exemplary embodiments of the present invention.

FIG. 3 is a block diagram illustrating an apparatus according to exemplary embodiments of the present invention. The apparatus may be an access node 20 such as an eNB comprising a receiving means 21, an allocating means 22, and a transmitting means 23. The receiving means 21 receives a radio resource control connection establishment request indicative of a demand of a proximity service. The allocating means 22 allocates radio resources for said proximity service. The transmitting means 23 transmits a radio resource control connection setup message including information indicative of said radio resources.

Figure 4:
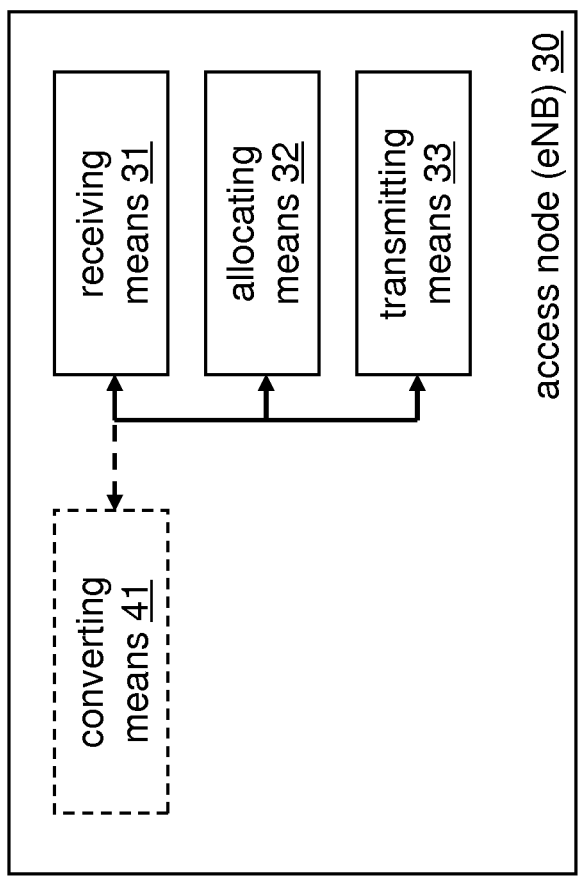
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the access node 20 shown in FIG. 3. The apparatus according to FIG. 4 may thus further comprise converting means 41.

Figure 8:
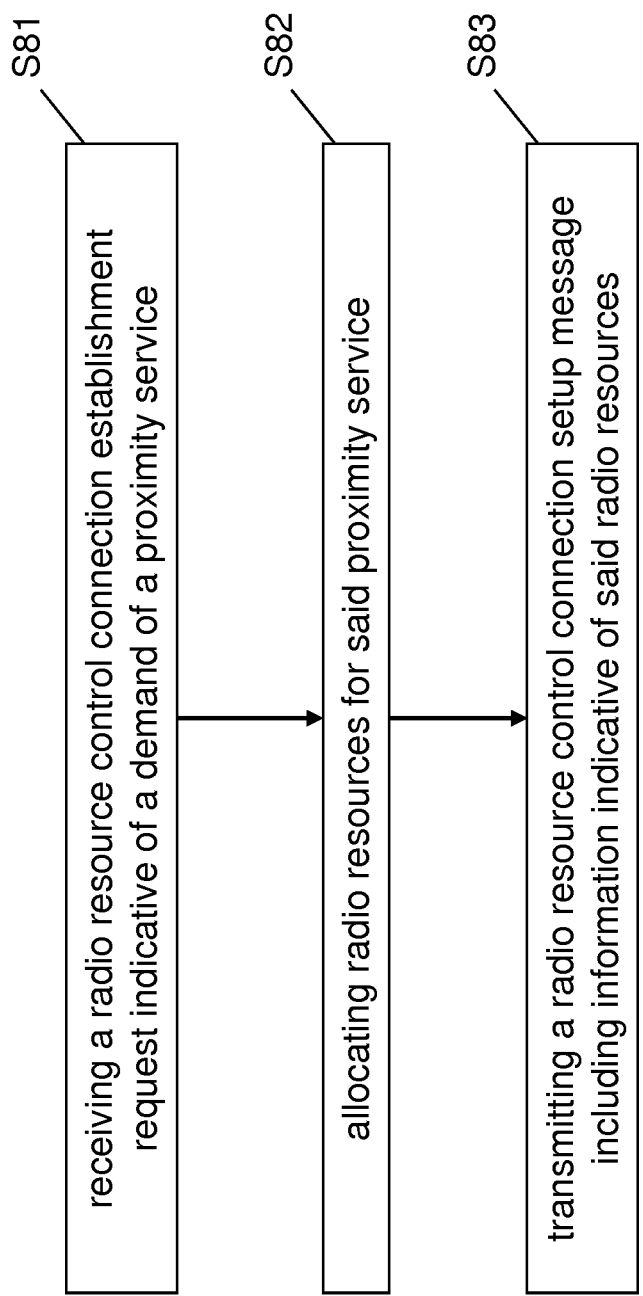
FIG. 8 is a schematic diagram of a procedure according to exemplary embodiments of the present invention.

FIG. 8 is a schematic diagram of a procedure according to exemplary embodiments of the present invention. The apparatus according to FIG. 3 (or FIG. 4) may perform the method of FIG. 8 but is not limited to this method. The method of FIG. 8 may be performed by the apparatus of FIG. 3 (or FIG. 4) but is not limited to being performed by this apparatus.

As shown in FIG. 8, a procedure according to exemplary embodiments of the present invention comprises an operation of receiving (S81) a radio resource control connection establishment request indicative of a demand of a proximity service, an operation of allocating (S82) radio resources for said proximity service, and an operation of transmitting (S83) a radio resource control connection setup message including information indicative of said radio resources.

According to a variation of the procedure shown in FIG. 8, exemplary additional operations are given, which are inherently independent from each other as such. According to such variation, an exemplary method according to exemplary embodiments of the present invention may comprise an operation of receiving, in response to said radio resource control connection setup message, a radio resource control connection setup complete message including a service request, and an operation of transmitting a message including said service request and indicative of said demand of said proximity service.

According to a variation of the procedure shown in FIG. 8, exemplary additional operations are given, which are inherently independent from each other as such. According to such variation, an exemplary method according to exemplary embodiments of the present invention may comprise an operation of receiving a downlink transport message, an operation of converting said downlink transport message into a downlink information transfer message, and an operation of transmitting said downlink information transfer message.

According to a variation of the procedure shown in FIG. 8, exemplary additional operations are given, which are inherently independent from each other as such. According to such variation, an exemplary method according to exemplary embodiments of the present invention may comprise an operation of receiving an end entity context release message, and an operation of transmitting, in response to said end entity context release message, a radio resource control release message.

Figure 5:
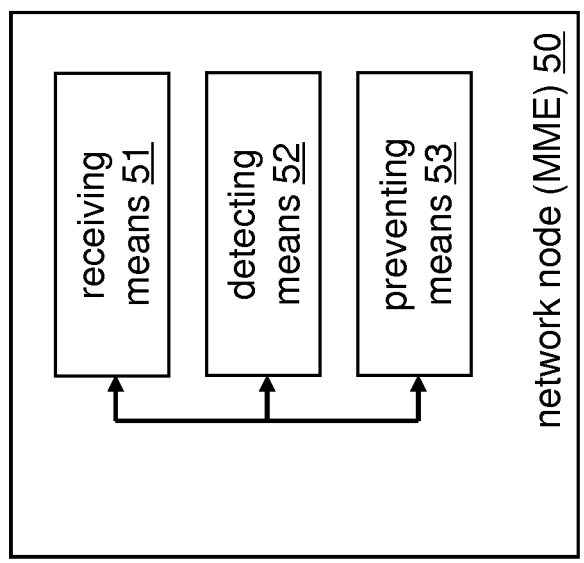
FIG. 5 is a block diagram illustrating an apparatus according to exemplary embodiments of the present invention.

FIG. 5 is a block diagram illustrating an apparatus according to exemplary embodiments of the present invention. The apparatus may be a network node 50 such as a mobility management entity comprising a receiving means 51, a detecting means 52, and a preventing means 53. The receiving means 51 receives a message including a service request and indicative of a demand of a proximity service. The detecting means 52 detects said demand of said proximity service from said message. The preventing means 53 prevents, based on said demand of said proximity service, a transmission of an end entity context related to said service request.

Figure 6:
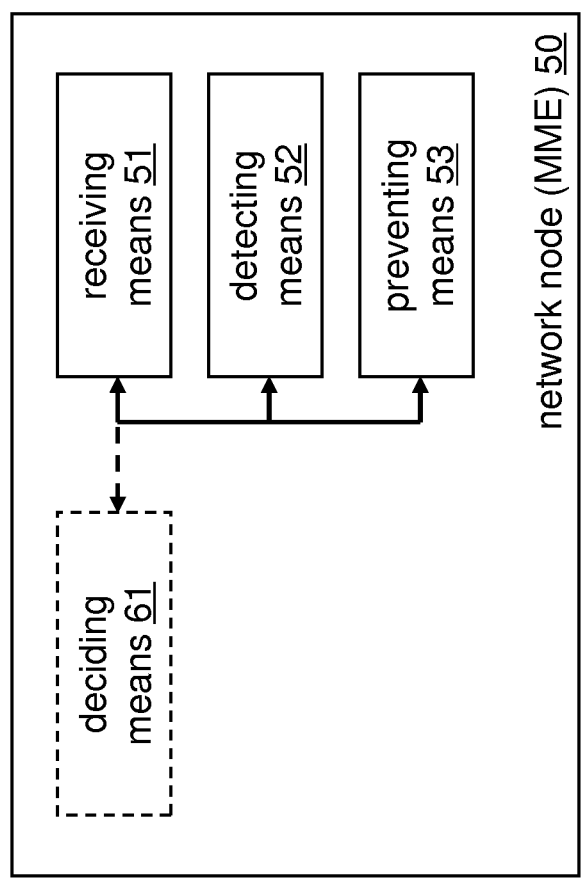
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the network node 50 shown in FIG. 5. The apparatus according to FIG. 6 may thus further comprise deciding means 61.

Figure 9:
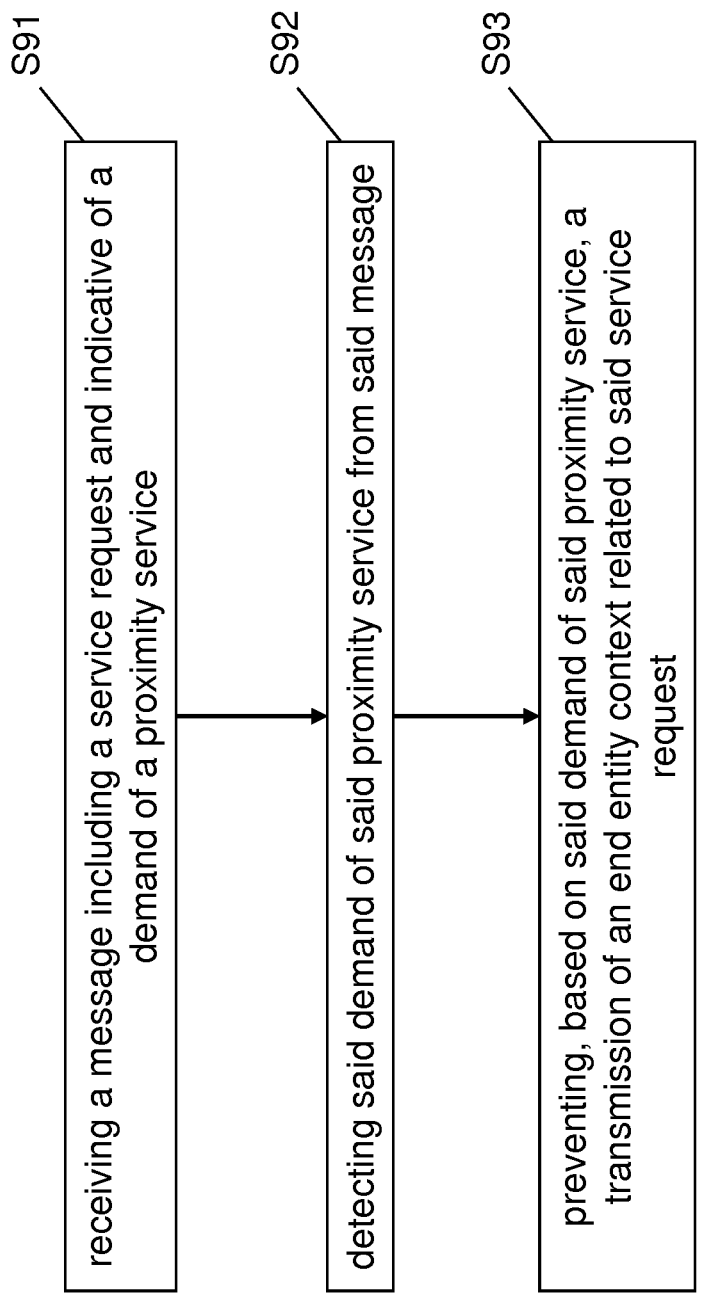
FIG. 9 is a schematic diagram of a procedure according to exemplary embodiments of the present invention.

FIG. 9 is a schematic diagram of a procedure according to exemplary embodiments of the present invention. The apparatus according to FIG. 5 (or FIG. 6) may perform the method of FIG. 9 but is not limited to this method. The method of FIG. 9 may be performed by the apparatus of FIG. 5 (or FIG. 6) but is not limited to being performed by this apparatus.

As shown in FIG. 9, a procedure according to exemplary embodiments of the present invention comprises an operation of receiving (S91) a message including a service request and indicative of a demand of a proximity service, an operation of detecting (S92) said demand of said proximity service from said message, and an operation of preventing (S93), based on said demand of said proximity service, a transmission of an end entity context related to said service request.

According to a variation of the procedure shown in FIG. 9, exemplary additional operations are given, which are inherently independent from each other as such. According to such variation, an exemplary method according to exemplary embodiments of the present invention may comprise an operation of preventing, based on said service request, an establishment procedure of a data radio bearer related to said service request.

According to a variation of the procedure shown in FIG. 9, exemplary additional operations are given, which are inherently independent from each other as such. According to such variation, an exemplary method according to exemplary embodiments of the present invention may comprise an operation of transmitting a downlink transport message.

According to a variation of the procedure shown in FIG. 9, exemplary additional operations are given, which are inherently independent from each other as such. According to such variation, an exemplary method according to exemplary embodiments of the present invention may comprise an operation of deciding to trigger a signaling connection release, and an operation of transmitting an end entity context release message based on said deciding.

The abovementioned service request may be a regular SERVICE REQUEST or an EXTENDED SERVICE REQUEST.

In the following, the first option according to exemplary embodiments of the present invention is described in other words with reference to FIG. 10.

Figure 10:
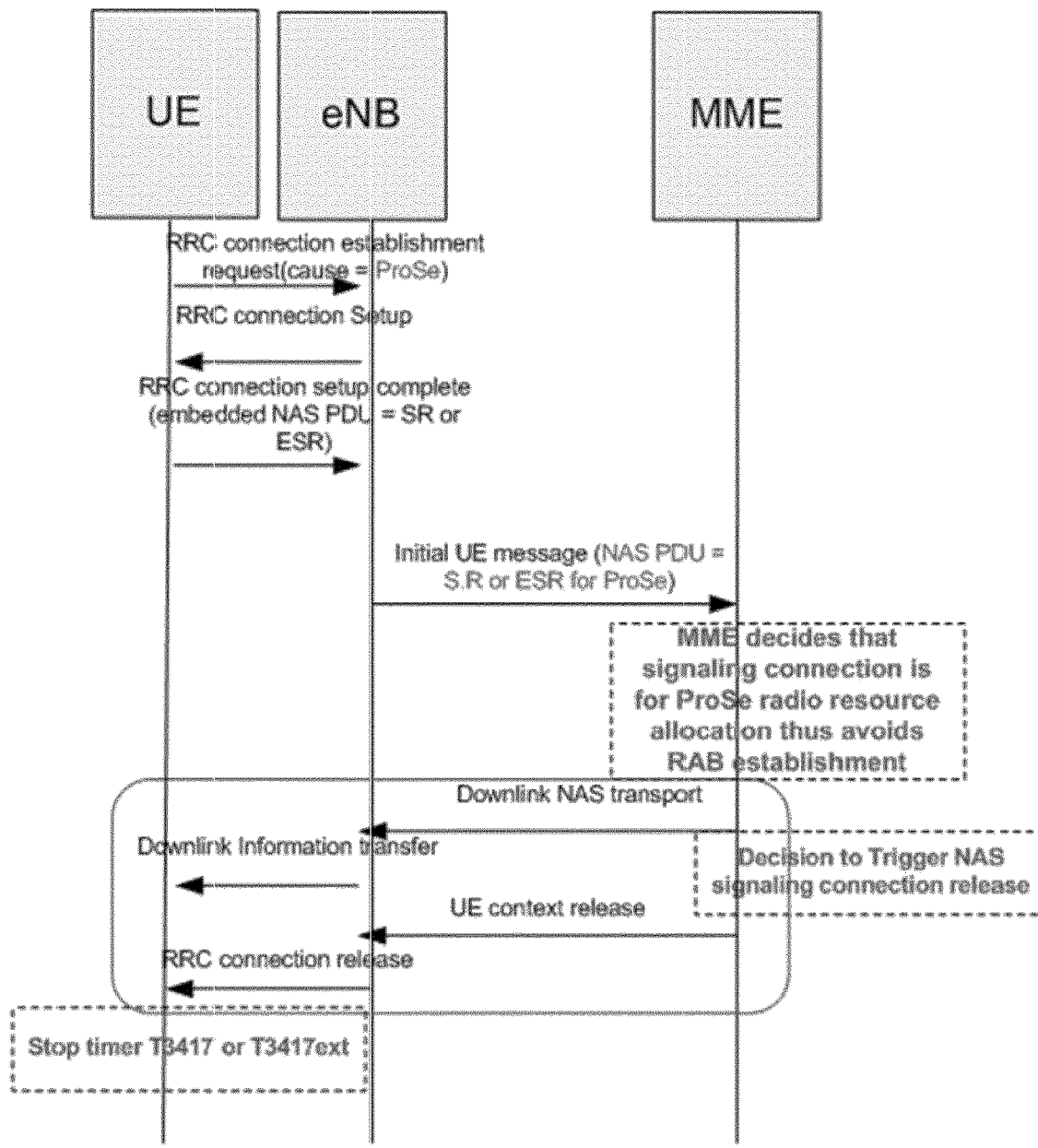
FIG. 10 shows a schematic diagram of signaling sequences according to exemplary embodiments of the present invention.

FIG. 10 shows a schematic diagram of signaling sequences according to exemplary embodiments of the present invention. The procedure according to the first option may be as follows.

The demand for a proximity service may be raised by any application within the UE which has a need to discover another device application, and which requests the lower layer to enable discovering another device application.

Based on broadcast system information received from the eNB, UE may determine that direct discovery is supported and that there is a need to establish RRC connection to obtain radio resources/send discovery indication to the network.

The UE NAS layer may initiate a service request to establish an RRC connection. This may be a regular SERVICE REQUEST without any service type or EXTENDED SERVICE REQUEST with a service type "ProSe".

As is shown on FIG. 10, the UE AS may then initiate an RRC connection with a new cause code "ProSe".

The eNB may then perform admission control based on establishment cause and accept by sending RRC Connection Setup. The eNB may also allocate radio resources for D2D discovery/communication as requested by the UE as part of this step.

The UE may acknowledge the receipt of RRC connection setup, may perform steps described in 3GPP technical specification (TS) 36.331, and UE may send a RRC connection complete including the NAS protocol data unit (PDU) (i.e. service request or extended service request (ESR)). This is an initial NAS message.

Further, the eNB may send the initial UE message with the NAS PDU to the MME. The eNB may wait to configure the UE for measurements, i.e., with a related RRC reconfiguration signaling, until a UE context is received from the MME for RRC establishment causes "ProSe".

Furthermore, the MME may determine from the NAS messages that the signaling connection is for ProSe radio resource allocation and it does not send any UE context to the eNB, which this avoids RRC signaling for measurements for an eNB that waits for UE contexts, and which avoids DRB and RRC security setup. In addition, MME may send an S1 message to the eNB to authorize the UE to obtain proximity services.

Then, MME may send a downlink NAS transport to the eNB.

Subsequently, the eNB may translates the downlink NAS transport to a downlink information transfer towards the UE.

Finally, the MME may also initiate UE context release to initiate NAS signaling connection release. This may trigger the eNB to release the RRC connection. This may also trigger the UE to stop timer T3417 or T3417ext.

According to this first option, the UE AS layer uses the successful RRC connection establishment and radio resource allocation for D2D discovery/communication as an indication that radio resources have been authorized. MME uses ProSe indication to avoid DRB establishment for SR procedure and to release the NAS signaling connection at the end of SR procedure.

According to a second option, in short, a service request procedure is performed, RABs are not established, and the network accepts the SR procedure if it was initiated for ProSe D2D discovery/communication upon completion. Further, the UE performs SR complete that can result in NAS signaling connection release. A successful RRC connection establishment and radio resource allocation for D2D discovery/communication is an indication that radio resources have been authorized. A successful SR accept is an indication to the UE NAS layer that the SR procedure is successfully complete. UE can acknowledge the receipt of SR accept with SR complete that can trigger the release of NAS signaling connection immediately.

According to a variation of the procedure shown in FIG. 7 according to the second option (which may comprise aspects of the first option), exemplary additional operations are given, which are inherently independent from each other as such. According to such variation, an exemplary method according to exemplary embodiments of the present invention may comprise an operation of receiving a service accept message, and an operation of transmitting a service complete message. In such case, the stopping said timer is based on said receiving of said service accept message.

Further, according to a variation of the procedure shown in FIG. 9 according to the second option (which may comprise aspects of the first option), exemplary additional operations are given, which are inherently independent from each other as such. According to such variation, an exemplary method according to exemplary embodiments of the present invention may comprise an operation of transmitting a service accept message, and an operation of receiving a service complete message. In such case, the deciding is based on said receiving of said service complete message.

In the following, the second option according to exemplary embodiments of the present invention is described in other words with reference to FIG. 11.

Figure 11:
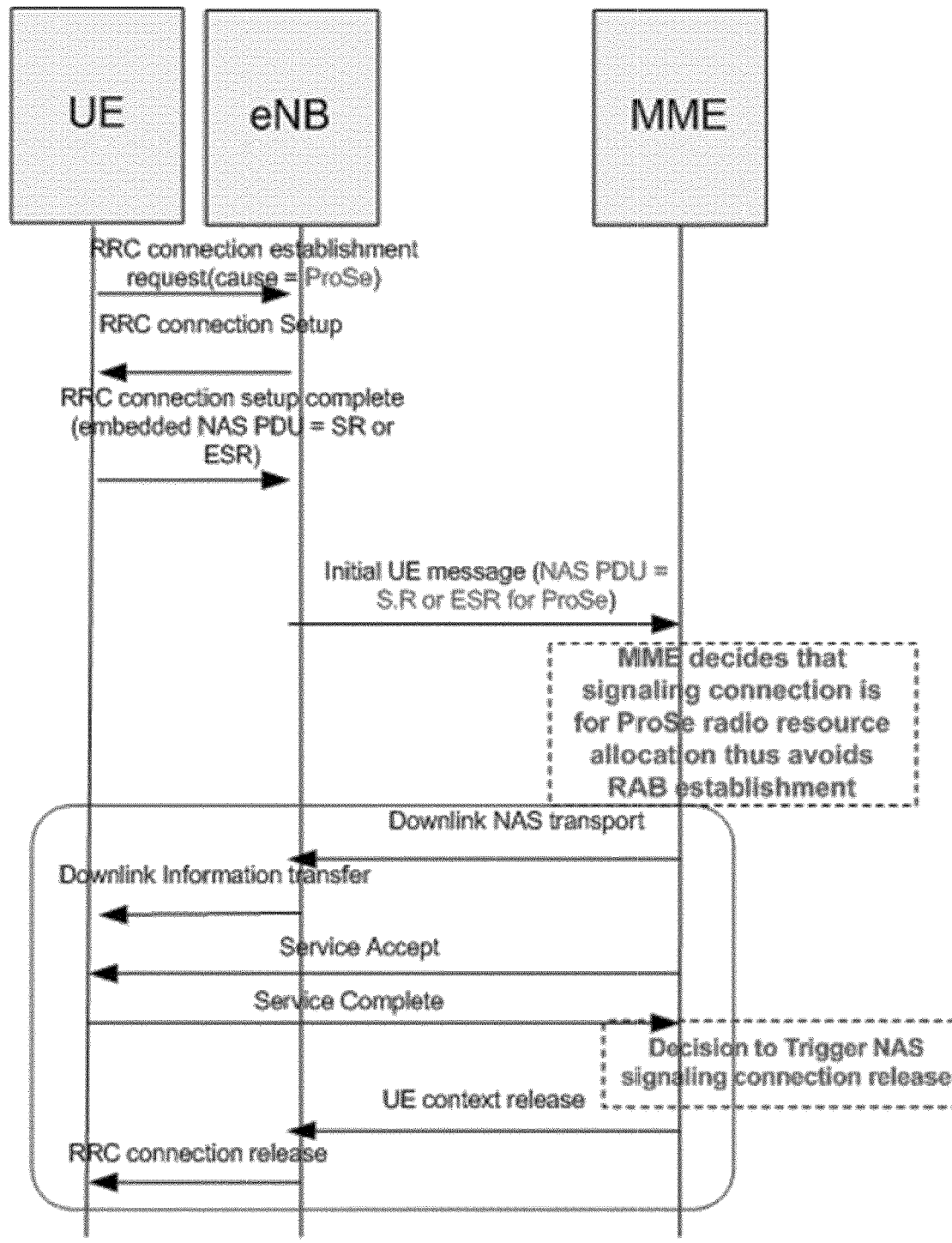
FIG. 11 shows a schematic diagram of signaling sequences according to exemplary embodiments of the present invention.

FIG. 11 shows a schematic diagram of signaling sequences according to exemplary embodiments of the present invention. The procedure according to the second option may be as follows.

The demand for a proximity service may be raised by any application within the UE which has a need to discover another device application, and which requests the lower layer to enable discovering another device application.

Based on broadcast system information received from the eNB, the UE may determine that direct discovery is supported and that there is a need to establish RRC connection to obtain radio resources/send discovery indication to the network.

The UE NAS layer may initiate a service request to establish an RRC connection. This may be a regular SER-VICE REQUEST without any service type or EXTENDED SERVICE REQUEST with a service type "ProSe".

As shown in FIG. 11, the UE AS may initiate an RRC connection with the new cause code "ProSe".

The eNB may perform admission control based on establishment cause and may accept by sending an RRC connection setup. The eNB may also allocate radio resources for D2D discovery/communication as requested by the UE as part of this behavior.

Then, the UE may acknowledge the receipt of an RRC connection setup, may perform steps described in 3GPP TS 36.331, and UE may send an RRC connection complete including the NAS PDU (service request or ESR). This is an initial NAS message.

The eNB may then send the initial UE message with the NAS PDU to an MME. The eNB may wait to configure the UE for measurements, i.e. with a related RRC reconfiguration signaling, until a UE context is received from the MME for RRC establishment causes "ProSe".

Subsequently, the MME may determine from the NAS messages that the signaling connection is for ProSe radio resource allocation and it may not send any UE context to the eNB, which avoids RRC signaling for measurements for an eNB that waits for UE contexts and which avoids DRB and RRC security setup. In addition, MME may send an S1 message to the eNB to authorize the UE to obtain proximity services.

Further, the MME may send downlink NAS transport to the eNB.

The eNB may then translate the downlink NAS transport to a downlink information transfer towards the UE.

Subsequently, the MME may also sends a service accept to indicate successful completion of the SR procedure to the UE. This may also trigger the UE to stop the abovementioned timer T3417 or T3417ext.

Finally, the UE may send a service complete to acknowledge the successful receipt of the service accept and to indicate that this connection with the network is no longer needed for any other purpose. The MME may use the service complete indication to release NAS signaling connection. This may in addition trigger the eNB to release the RRC connection.

According to this second option, the UE AS layer uses the successful RRC connection establishment and radio resource allocation for D2D discovery/communication as an indication that radio resources have been authorized. The MME uses ProSe indication to avoid DRB establishment for SR procedure and it uses the service complete indication to release the NAS signaling connection at the end of the SR procedure.

According to exemplary embodiments of the present invention, techniques are provided for radio resource allocation for D2D discovery and communication in LTE without having to establish all radio access bearers (RAB), i.e., without bringing up all packet data network (PDN) connections and bearers, when they are not necessary. Furthermore, according to exemplary embodiments of the present invention, existing "always on" principles in LTE are retained by releasing NAS signaling connection for the UE immediately upon completion of the SR procedure performed without RAB establishment.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 12:
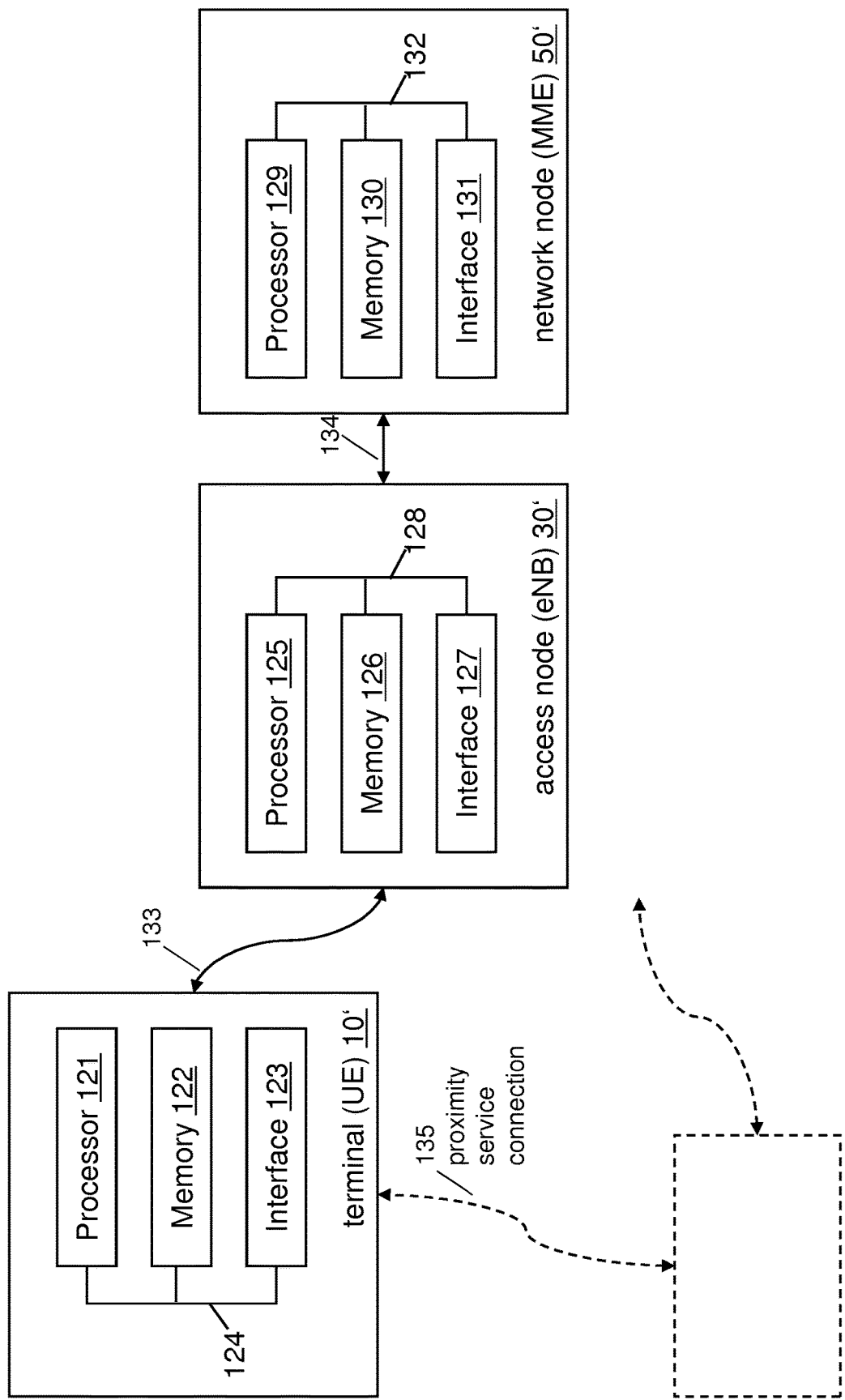
FIG. 12 is a block diagram alternatively illustrating apparatuses according to exemplary embodiments of the present invention.

In FIG. 12, an alternative illustration of apparatuses according to exemplary embodiments of the present invention is depicted. As indicated in FIG. 12, according to exemplary embodiments of the present invention, the apparatus (terminal) 10' (corresponding to the terminal 10) comprises a processor 121, a memory 122 and an interface 123, which are connected by a bus 124 or the like. Further, according to exemplary embodiments of the present invention, the apparatus (access node) 30' (corresponding to the access node 30) comprises a processor 125, a memory 126 and an interface 127, which are connected by a bus 128 or the like. Further, according to exemplary embodiments of the present invention, the apparatus (network node) 50' (corresponding to the network node 50) comprises a processor 129, a memory 130 and an interface 131, which are connected by a bus 132 or the like. The apparatuses may be connected via links 133, 134, respectively.

The processor 121/125/129 and/or the interface 123/127/131 may also include a modem or the like to facilitate communication over a (hardwire or wireless) link, respectively. The interface 123/127/131 may include a suitable transceiver coupled to one or more antennas or communication means for (hardwire or wireless) communications with the linked or connected device(s), respectively. The interface 123/127/131 is generally configured to communicate with at least one other apparatus, i.e. the interface thereof.

The memory 122/126/130 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 121, at least one memory 122 including computer program code, and at least one interface 123 configured for communication with at least another apparatus. The processor (i.e. the at least one processor 121, with the at least one memory 122 and the computer program code) is configured to perform transmitting a radio resource control connection establishment request indicative of a demand of a proximity service (thus the apparatus comprising corresponding means for transmitting), to perform receiving a radio resource control connection setup message including information indicative of radio resources allocated for said proximity service (thus the apparatus comprising corresponding means for receiving), and to perform deciding, whether said radio resources are authorized, based on said receiving of said radio resource control connection setup message (thus the apparatus comprising corresponding means for deciding).

According to exemplary embodiments of the present invention, an apparatus representing the access node 30 comprises at least one processor 125, at least one memory 126 including computer program code, and at least one interface 127 configured for communication with at least another apparatus. The processor (i.e. the at least one processor 125, with the at least one memory 126 and the computer program code) is configured to perform receiving a radio resource control connection establishment request indicative of a demand of a proximity service (thus the apparatus comprising corresponding means for receiving), to perform allocating radio resources for said proximity service (thus the apparatus comprising corresponding means for allocating), and to perform transmitting a radio resource control connection setup message including information indicative of said radio resources (thus the apparatus comprising corresponding means for transmitting).

According to exemplary embodiments of the present invention, an apparatus representing the network node 50 comprises at least one processor 129, at least one memory 130 including computer program code, and at least one interface 131 configured for communication with at least another apparatus. The processor (i.e. the at least one processor 129, with the at least one memory 130 and the computer program code) is configured to perform receiving a message including a service request and indicative of a demand of a proximity service (thus the apparatus comprising corresponding means for receiving), to perform detecting said demand of said proximity service from said message (thus the apparatus comprising corresponding means for detecting), and to perform preventing, based on said demand of said proximity service, a transmission of an end entity context related to said service request (thus the apparatus comprising corresponding means for preventing).

For further details regarding the operability/functionality of the individual apparatuses, reference is made to the above description in connection with any one of FIGS. 1 to 11, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for radio resource allocation for proximity services. Such measures exemplarily comprise receiving a message including a service request and indicative of a demand of a proximity service, detecting said demand of said proximity service from said message, and preventing, based on said demand of said proximity service, a transmission of an end entity context related to said service request.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| 3GPP | 3$^{rd}$ Generation Partnership Project |
| AS | access stratum |
| D2D | device to device |
| DRB | data radio bearer |
| eNB | evolved NodeB |
| ESR | extended service request |
| LTE | Long Term Evolution |
| MME | mobility management entity |
| NAS | non-access stratum |
| PDN | packet data network |
| ProSe | proximity service |
| RAB | radio access bearer |
| RRC | radio resource control |
| SIB | system information block |
| SR | service request |
| SRB | signaling radio bearer |
| TS | technical specification |
| UE | user equipment |

The invention claimed is:

1. A method comprising
transmitting a radio resource control connection establishment request indicative of a demand of a proximity service,
receiving a radio resource control connection setup message including information indicative of radio resources allocated for said proximity service, and
deciding, whether said radio resources are authorized, based on said receiving of said radio resource control connection setup message.

2. The method according to claim 1, further comprising
transmitting, in response to said radio resource control connection setup message, a radio resource control connection setup complete message including a service request.

3. The method according to claim 1, further comprising
receiving a downlink information transfer message.

4. The method according to claim 2, further comprising receiving a radio resource control release message, and stopping a timer indicative of a successful completion of a procedure related to said service request.

5. The method according to claim 4, further comprising receiving a service accept message, and
transmitting a service complete message, wherein
said stopping said timer is based on said receiving of said service accept message.

6. A computer program product comprising computer-executable computer program code stored on a non-transitory medium which, when the program is run on a computer, is configured to cause the computer to carry out the method according to claim 1.

7. A method comprising
receiving a radio resource control connection establishment request indicative of a demand of a proximity service,
performing admission control based on the request indicative of a demand of a proximity service,
allocating radio resources for said proximity service, and
transmitting a radio resource control connection setup message including information indicative of said radio resources.

8. The method according to claim 7, further comprising receiving, in response to said radio resource control connection setup message, a radio resource control connection setup complete message including a service request, and
transmitting a message including said service request and indicative of said demand of said proximity service.

9. The method according to claim 7, further comprising receiving a downlink transport message,
converting said downlink transport message into a downlink information transfer message, and
transmitting said downlink information transfer message.

10. The method according to claim 7, further comprising receiving an end entity context release message, and
transmitting, in response to said end entity context release message, a radio resource control release message.

11. A method comprising
a mobility management entity receiving a message including a service request and indicative of a demand of a proximity service,
the mobility management entity detecting said demand of said proximity service from said message, and
the mobility management entity preventing, based on said demand of said proximity service, a transmission of an end entity context related to said service request as part of enabling the provision of the service.

12. The method according to claim 11, further comprising preventing, based on said service request, an establishment procedure of a data radio bearer related to said service request.

13. The method according to claim 11, further comprising transmitting a downlink transport message.

14. The method according to claim 11, further comprising deciding to trigger a signaling connection release, and
transmitting an end entity context release message based on said deciding.

15. The method according to claim 14, further comprising transmitting a service accept message, and
receiving a service complete message, wherein
said deciding is based on said receiving of said service complete message.

16. An apparatus comprising
a transmitter configured to transmit a radio resource control connection establishment request indicative of a demand of a proximity service,
a receiver configured to receive a radio resource control connection setup message including information indicative of radio resources allocated for said proximity service, and
a processor configured to decide, whether said radio resources are authorized, based on said receiving of said radio resource control connection setup message.

17. An apparatus comprising
a receiver configured to receive a radio resource control connection establishment request indicative of a demand of a proximity service,
a processor configured to perform admission control based on the request indicative of a demand of a proximity service,
a processor configured to allocate radio resources for said proximity service, and
a transmitter configured to transmit a radio resource control connection setup message including information indicative of said radio resources.

18. A mobility management entity apparatus comprising
a receiver configured to receive a message including a service request and indicative of a demand of a proximity service,
a detector configured to detect said demand of said proximity service from said message, and
a processor configured to prevent, based on said demand of said proximity service, a transmission of an end entity context related to said service request as part of enabling the provision of the service.

* * * * *